United States Patent [19]
Haddock et al.

[11] Patent Number: 5,428,444
[45] Date of Patent: Jun. 27, 1995

[54] REAL TIME INTERFEROMETRIC COMPARATOR

[75] Inventors: Loren B. Haddock, Paradise; George H. Gelb, Rancho Palos Verdes, both of Calif.

[73] Assignee: TRW Inc., Redondo Beach, Calif.

[21] Appl. No.: 932,396

[22] Filed: Aug. 19, 1992

[51] Int. Cl.$^6$ ............................................. G01B 9/021
[52] U.S. Cl. .................... 356/347; 356/349; 356/359; 359/846
[58] Field of Search ............... 356/347, 349, 353, 359, 356/360, 388, 389, 394, 124; 359/846, 847, 848, 849

[56] References Cited

U.S. PATENT DOCUMENTS

| | | | |
|---|---|---|---|
| 3,721,498 | 3/1973 | Narodny et al. | 356/394 |
| 4,091,274 | 5/1978 | Angelbeck et al. | 359/849 |
| 4,093,351 | 6/1978 | Perkins et al. | 359/847 |
| 4,536,086 | 8/1985 | Shemwell | 356/348 |
| 4,725,144 | 2/1988 | Nelson et al. | 359/846 |
| 4,925,301 | 5/1990 | Rafanelli | 356/124 |

OTHER PUBLICATIONS

Morrison, SPIE Journal, vol. 8, May 1970, pp. 107–118.

*Primary Examiner*—F. L. Evans

[57] ABSTRACT

A real time interferometric comparator apparatus. The apparatus generally includes means for projecting at least a first optical signal onto a complexly shaped surface such as a curved surface of a large reflector antenna of a satellite system, to thereby create an interferogram indicative of irregularities in the curvature of the reflector's surface. A scanning device scans the interferogram and transmits electrical signals in accordance with the scanned interferogram to a processing device which includes a comparator for comparing the scanned interferogram with a model or reference workpiece having a desired, or "perfect", surface. The processing device determines if any errors are present in the scanned interferogram and, if so, transmits error correction signals to an adjusting apparatus associated with the workpiece, to thereby provide a closed loop control system for continuously monitoring and correcting errors in the curvature of the workpiece such as the reflector antenna in real time. In alternative preferred embodiments holography is employed to generate the interferogram. The various preferred embodiments are particularly well adapted to aerospace applications and provide an extremely precise means for monitoring and controlling, in real time, the curvature of reflector antenna systems, as well as monitoring and controlling manufacturing operations, test operations, and analyzing operations.

16 Claims, 3 Drawing Sheets

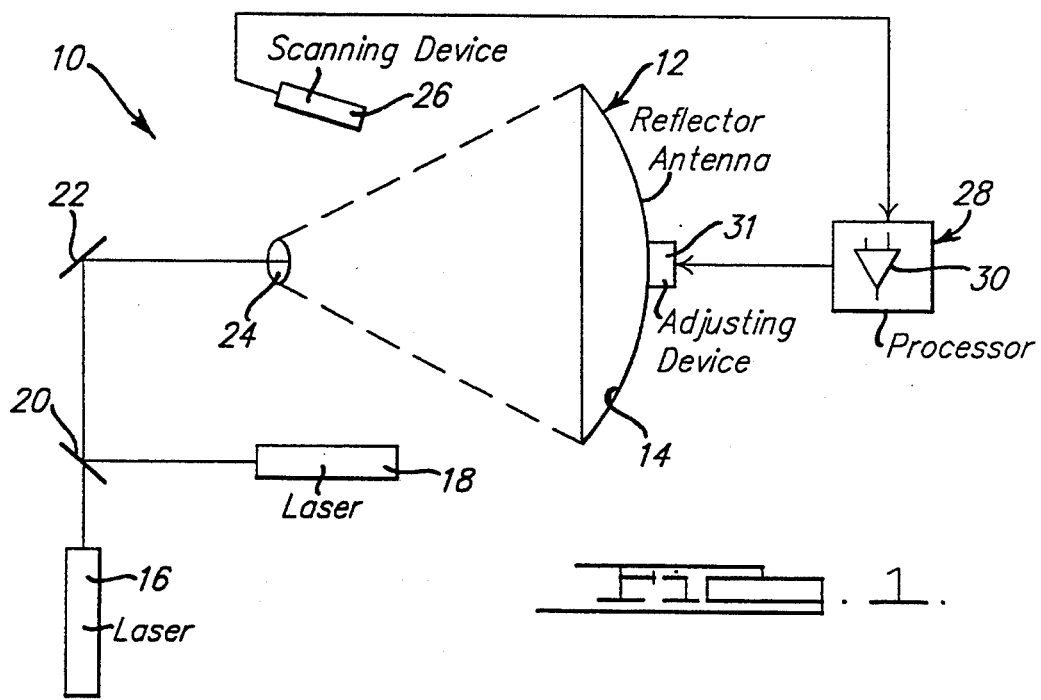
FIG. 1.
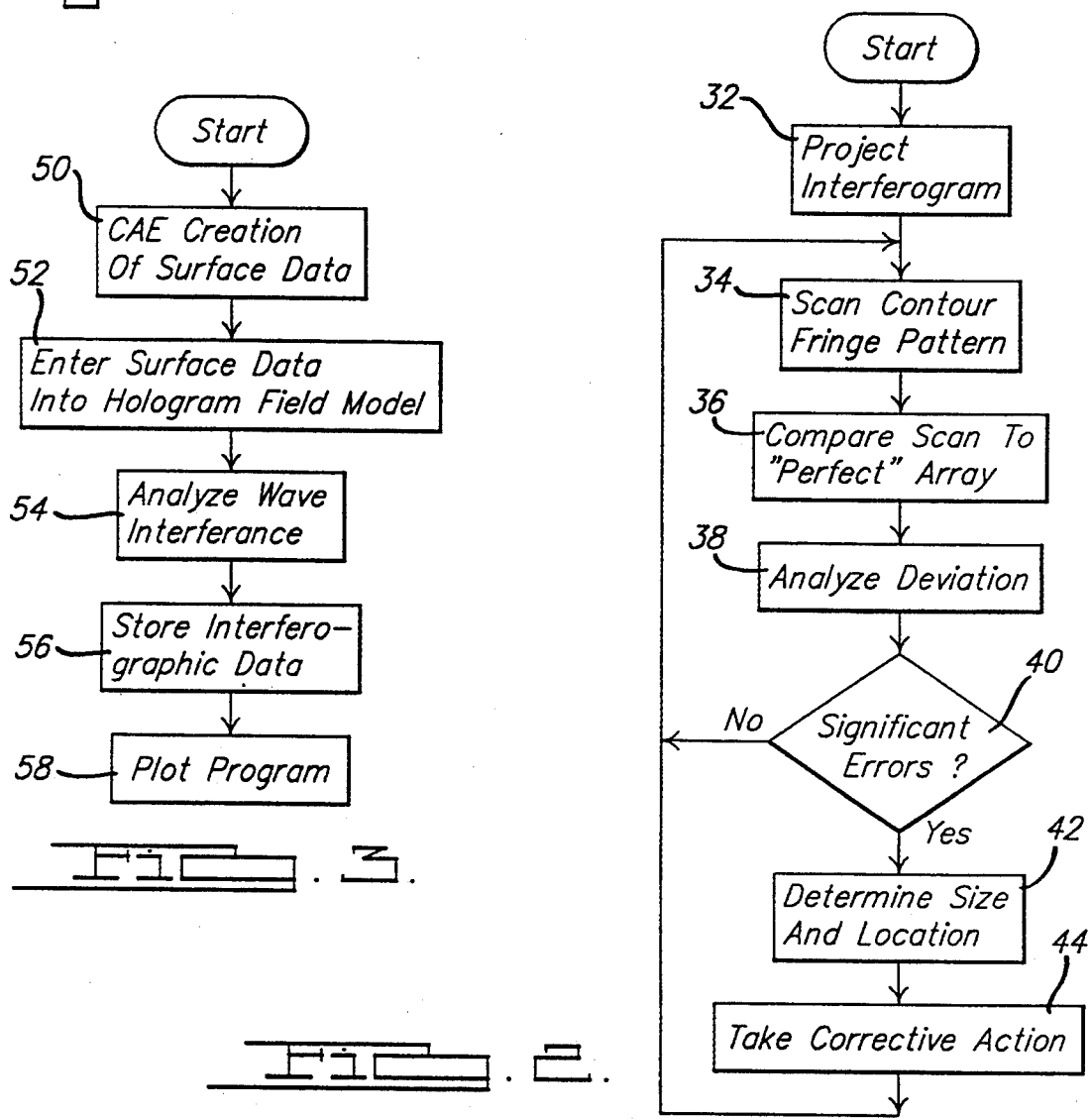
FIG. 3.
FIG. 2.

REAL TIME INTERFEROMETRIC COMPARATOR

BACKGROUND OF THE INVENTION

1. Technical Field

This invention relates to systems for optically determining the deviation in the curvature of a workpiece from a reference workpiece, and more particularly to a real time interferometric comparator for optically determining deviations in the curvature of a reflector, such as an antenna, from the curvature of a reference reflector.

2. Discussion

Current satellite frequency bands are being raised to provide new spectrum space due to the allocations of existing frequency bands and the required separation necessary to meet economical ground station beamwidth parameters. The extension into shorter wavelength, $\lambda$, communication systems has made necessary new measuring, manufacturing, testing and alignment techniques with respect to antennas, such as curved reflectors used with orbiting satellite systems, to achieve and maintain acceptable surface contour accuracies. Presently, surface contour accuracies in the range of about $\lambda/50$ to $\lambda/100$ represent a minimum acceptable range of surface contour accuracies. Many applications, however, require accuracies greater than $\lambda/100$.

Three characteristics of an antenna pattern are particularly important. The first is the intensity of the radiated pattern at the center of the antenna. This characteristic is typically known as "main-lobe gain". The main lobe gain of an antenna establishes how much power must be supplied to the antenna aperture in order to achieve an acceptable power density at the receiving element or, conversely, it determines the required strength of the transmitter signal at the radiating element to generate adequate field density at the aperture of the antenna. Radio frequency (RF) energy distributions in common reflector antenna systems are highly dependent upon the shape and RMS surface accuracy of the reflector.

Current techniques of measuring and adjusting antenna reflector surfaces of high performance reflector antennas operating in the millimeter wave region (30 GHz to 100 GHz) suffer from a number of drawbacks. Such current techniques are typically time consuming, expensive and yield results which are difficult to process, and which are further not provided in real time. Current techniques also often lack the accuracy to properly confirm the contour mapping of large, high performance reflector antennas.

One new technology that attempts to overcome the above-mentioned shortcomings involves the use of modulated, laser radar to determine the location and magnitude of irregularities in an antenna reflector surface. However, this technology requires high pixel residence times to gain the accuracy necessary to approach and maintain RMS surface contour accuracies up to $\lambda/100$. On large, short wavelength reflectors the number of pixels can range into the millions, thus increasing the measurement error of such systems.

In satellite applications, it is particularly important to be able to detect and correct errors in the curvature of irregularly curved reflector antennas in real time. Irregularities may be caused by changing thermal conditions which are brought on by an orbiting pattern of the satellite, such as when the satellite enters and leaves areas covered by shadows. Current systems and methods are presently unable to monitor changes in surface contours of irregularly shaped curved surfaces due to manufacture, test, alignment procedures and/or orbit conditions in near real time. Providing this capability could significantly reduce manufacturing costs associated with manufacturing large reflector antennas as well as virtually any other curved workpiece. This could also help to improve the accuracy of the surface of such a reflector antenna or other workpiece, in addition to providing a means of monitoring and correcting large reflector antenna surfaces while such antennas are on orbit.

Accordingly, it is a principal object of the present invention to provide a real time, interferometric comparator which is operable to optically monitor and detect irregularities in the curvature of a large, curved object such as a reflector antenna of a satellite, and to provide correction signals to the reflector antenna to enable controlled changes in the curvature of the antenna to be implemented, to thereby eliminate irregularities in the curvature in real time.

It is a further object of the present invention to provide a closed loop, real time interferometric comparator apparatus particularly well adapted to monitoring the curvature of curved reflector antennas of orbiting satellite systems and to provide highly precise corrections to such curved reflector antennas, in real time, to maintain a desired curvature for such reflector antennas.

It is yet another object of the present invention to provide a real time interferometric comparator apparatus which may be implemented using conventional interferometric technology to monitor the curvature of a reflector antenna.

It is still another object of the present invention to provide a real time interferometric comparator apparatus which may be implemented with conventional holographic imaging techniques for monitoring the curvature of large reflector antennas.

It is still another object of the present invention to provide a closed loop, real time interferometric comparator apparatus which may be used in manufacturing, test and alignment processes to provide an indication, in real time, of irregularities in the curvature of a large, curved workpiece, to thereby enable corrections to be applied to the workpiece, such as in manufacturing applications, in real time.

SUMMARY OF THE INVENTION

The above and other objects are provided by a real time interferometric comparator apparatus in accordance with preferred embodiments of the present invention. The apparatus generally comprises means for generating at least a first optical signal, means for projecting the first optical signal onto a curved workpiece such as a reflector antenna, at a first angle relative to the workpiece, means for scanning the workpiece while the first optical signal is being projected thereon, and processing means responsive to the scanning means for determining irregularities, in real time, in the curvature of the workpiece.

In one preferred embodiment, first and second optical signals are generated and projected at first and second angles, respectively, onto the surface of a workpiece. The first and second optical signals form an interferogram in real time which is indicative of irregularities in the curvature of the workpiece. Processing means determines the precise location and magnitude of the irregularities and generates an error correction signal in accordance therewith. Adjusting means associated with the workpiece, and responsive to the error correction signal, then causes the curvature of the workpiece to be controllably modified to remove the irregularities in the curvature.

In an alternative preferred embodiment, the apparatus includes means for generating a laser beam, means for splitting the laser beam into a first laser beam having a first wavelength and a second laser beam having a second wavelength, where each of the first and second laser beams are projected onto the surface of a curved workpiece such as a reflector antenna of a satellite system. Scanning means are included for scanning the surface of the workpiece while the first and second laser beams are being projected thereon, the first and second laser beams generating an interferogram, and processing means responsive to the scanning means for processing the interferogram and determining therefrom irregularities in the curvature of the workpiece.

In another alternative preferred embodiment means are provided for generating first and second identical holograms, where the holograms are further indicative of the curvature of a reference workpiece having a desired curvature. The holograms are projected onto the curved surface of the workpiece at different angles relative to the workpiece, and means are provided for scanning the resulting, composite holographic image. Processing means responsive to the scanning means determines the location and magnitude of irregularities in the curvature of the workpiece relative to the desired curvature of the reference workpiece. Adjusting means associated with the workpiece and responsive to the processing means further enables real time corrections to be applied to the curvature of the workpiece to eliminate irregularities in the curvature, to thereby bring the curvature of the workpiece into conformance with the desired curvature of the reference workpiece.

Accordingly, the apparatus of the present invention is operable to provide closed loop, real time monitoring of the curvature of large, irregularly curved surfaces such as reflector antennas and to enable corrections to be applied to such work surfaces, in real time, to eliminate irregularities in curvature resulting from thermal stresses, for example, incurred during on-orbit travel.

The apparatus of the present invention further provides a means by which manufacture, alignment and test procedures on large, irregularly shaped curved workpieces can be more accurately monitored and controlled. In particular, the apparatus of the present invention can significantly enhance manufacturing, alignment and test operations on large curved workpieces to enable these operations to be carried out more efficiently and effectively, in real time.

BRIEF DESCRIPTION OF THE DRAWINGS

The various advantages of the present invention will become apparent to one skilled in the art by reading the following specification and subjoined claims and by referencing the following drawings in which:

FIG. 1 is a simplified schematic drawing of a closed loop, real time interferometric comparator apparatus incorporating first and second laser beams having different wavelengths, in accordance with a preferred embodiment of the present invention;

FIG. 2 is a simplified flow chart of the basic steps of operation of the apparatus of FIG. 1;

FIG. 3 is a simplified flow chart of the basic steps involved in generating a reference holographic image from a computer aided engineering model of a reference workpiece having a perfect, or ideal, curvature;

FIG. 8 is a simplified flow chart of the basic steps of operation of the apparatus of FIG. 5.

DETAILED DESCRIPTION OF THE PREFERRED EMBODIMENT

Figure 4:
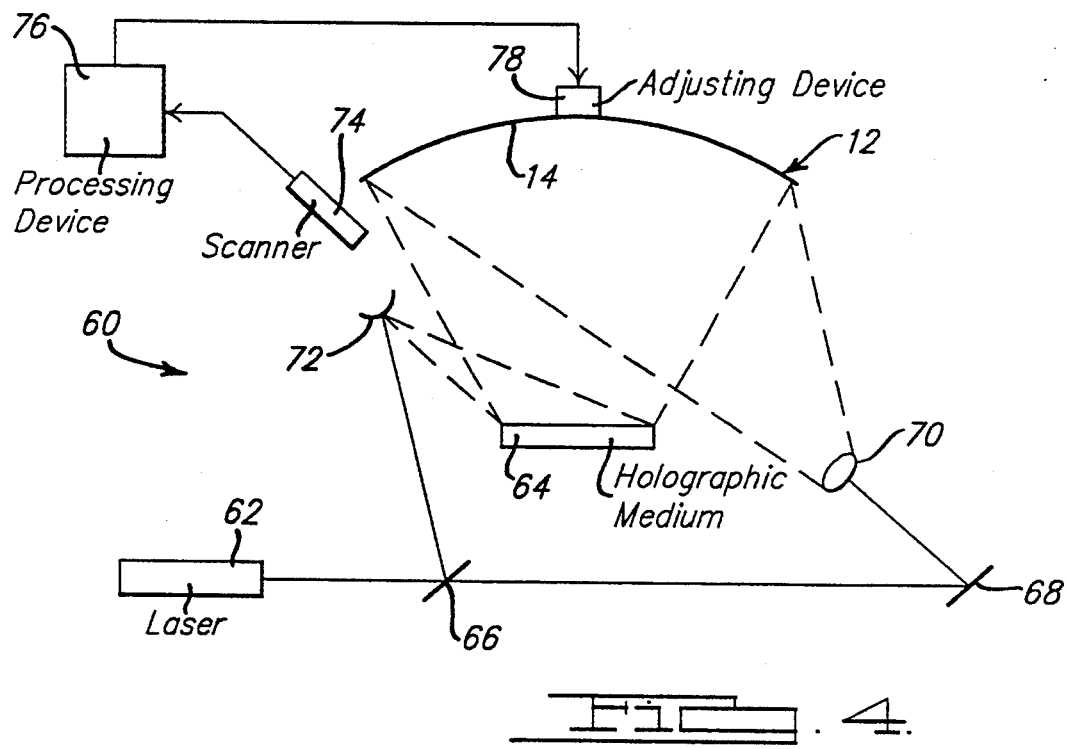
FIG. 4 is a schematic diagram of a closed loop, real time interferometric comparator apparatus in accordance with an alternative preferred embodiment of the present invention incorporating the use of first and second identical holograms representative of a perfectly, or ideally, curved workpiece.

Referring to FIG. 1, there is shown a closed loop, real time interferometric comparator apparatus 10 in accordance with the preferred embodiment of the present invention. A reflector antenna 12 is also illustrated in a simplified manner and includes a curved surface 14. It will be appreciated, however, that reflector 12 could take the form of any workpiece having any complexly shaped surface.

The apparatus 10 generally includes a first laser 16 for generating a first beam of coherent light having a first wavelength ($\lambda_1$), a second laser beam 18 for generating a second beam of coherent light having a second wavelength ($\lambda_2$), a beam splitter 20, a turning flat 22, a focusing lens 24, scanning means 26 for scanning the curved surface of the reflector 14, a processor 28 including a comparator 30, and an adjusting means 31 associated with the reflector antenna 12 and responsive to the processor 28 for applying correction signals to modify the curvature of the curved surface 14. The adjusting means may comprise any conventional mechanical worm screw or piezoelectric element suitable to controllably deform the surface 14 of the reflector 12. The first and second beams of coherent light from lasers 16 and 18, respectively, are directed by beam splitter 20 towards turning flat 22, which in turn simultaneously directs the light beams in a superimposed fashion on the surface 14 of reflector 12. This causes the first and second light beams to illuminate the curved surface 14 and form beating wavelets which produce a contour map.

The elevation (L) of each contour of the contour map is represented by the formula: $L = 2(\lambda^2_1/\Delta\lambda)$, where $\Delta\lambda$ is the absolute difference of the wavelengths $\lambda_1$ and $\lambda_2$. As an example, a commonly available low cost helium-ion laser is capable of a few wavelength modes, two of which are 543 nanometers (nm) and 594 nm. If two of these lasers are used in an interferometer at the above modes then the difference in elevation of the contour lines is about 0.004 inch. The selection of wavelengths of lasers 16 and 18 thus determines the accuracy of the contouring. When projected on the curved surface 14, the first and second light beams generate a highly accurate interferogram indicative of the true curvature of curved surface 14.

The surface 14 of reflector 12 is then scanned by the scanning means 26, which may comprise any conventional, spatially filtered charge coupled device matrix, which sends an electrical signal representative of the scanned optical signal to the processor 28. The comparator 30 of the processor 28 compares the interferogram generated by the superimposed first and second beams of coherent light with a predetermined, desired optical reference image or pattern representative of a reflector having a curved surface with no irregularities or abnormalities. This is accomplished by entering data from the scanned interferogram into a two dimensional array which is then compared with the array data of an ideal reference workpiece having a surface with the desired curvature. The array data for the reference workpiece is created by solving the interference surface equations representing the reference workpiece surface. The deviation of scanned array data from the reference array can then be analyzed to determine the size and extent of errors in the actual curved surface 14.

If the curved surface 14 of the reflector 12 is in accordance with the desired curvature of the reference reflector, then no corrective action is taken by the adjusting means 31. However, if the interferogram generated at the surface 14 of the reflector 12 differs from that of the reference workpiece, an appropriate error correction signal is transmitted to the adjusting means 31, in real time, to enable the adjusting means 31 to modify the curvature of the curved surface 14 to match the curvature of the reference reflector, as indicated by the optical reference image. Accordingly, the apparatus 10 operates to continuously monitor, in real time, the curvature 14 of the reflector 12 and to apply error correction signals, also in real time, to the curved surface 14 whenever the curvature of the curved surface 14 deviates from the desired curvature of a reference reflector, as represented by a predetermined optical reference image.

Referring briefly to FIG. 2, a simplified block diagram of the steps of operation of the apparatus 10 of FIG. 1 is shown. Initially, the interferogram is created at the surface 14 of the reflector 12, as indicated by block 32. Next, the "fringe pattern" of the interferogram is scanned, as indicated at 34, by scanning device 26. The scanned interferogram is then compared to the array representing the reference workpiece, as indicated at step 36, and the deviation therebetween is analyzed, as indicated at step 38, by the processor 28.

A check is made for significant errors in the above-mentioned deviation, as indicated at step 40, by the processor 28, and if no significant errors have occurred the apparatus 10 loops back to again scan the fringe pattern of the interferogram, as indicated at step 34. If a significant error has been detected, the processor 28 determines the size (i.e., magnitude) and precise location of the error, as indicated at step 42, and takes corrective action, as indicated at step 44, by applying an error correction signal to the adjusting means 31 associated with the reflector 12. Subsequently, the fringe pattern of the interferogram is scanned again, as indicated at step 34.

Referring now to FIGS. 3 and 4, the implementation of an alternative preferred embodiment employing holograms to create an interferogram indicative of irregularities in the curve surface of a workpiece will be discussed. Referring initially to FIG. 3, when using holography, a computer generated hologram is typically first made. The simplified block diagram of FIG. 3 describes this process. Using well known computer aided engineering (CAE) systems, surface data representing a complex surface of a reference workpiece is first created, as indicated at step 50. The surface data is then entered into a hologram field model, as indicated at step 52. The model involves the directing of two coherent light paths at a holographic plane.

Next, using a fourier analysis, the wavefronts of the two coherent light paths are summed at a holographic plane. The beating wavelets produce a hologram representative of the surface of the reference workpiece, which has a "perfect" or desired curvature, all as indicated at step 54. The hologram, which is representative of interferographic data, is then stored in a suitable storage medium such as on magnetic disk or magnetic tape, as indicated at step 56. The hologram is then plotted with high resolution as a transparency or directly on a suitable holographic medium such as film, as indicated at step 58.

In FIG. 4, another alternative preferred embodiment 60 of the present invention is shown employing the hologram created from the process described in FIG. 3. In this embodiment 60 a single laser 62 projects a holographic image onto a holographic medium 64 via beam splitter 66, turning flat 68, lens 70 and a mirror 72. Holographic medium 64 is a holographic image, such as that created by the process described in FIG. 3, of a perfect or ideal reflector or workpiece. The holographic image projected by the laser 62 is identical to the image recorded on the holographic medium 64.

The holographic image projected by laser 62 is directed by mirror 72 onto the holographic medium 64 and onto the reflector surface 14 by lens 70. Any variance or irregularity in the surface 14 of the reflector 12 causes an interference pattern to be generated on the holographic medium 64. A scanner 74 reads the interference pattern and transmits corresponding signals to processing device 76. The processing device 76 then applies appropriate corrective signals to an adjusting device 78 operably associated with the reflector 12. The adjusting device 78, which may be identical to adjusting means 31 (FIG. 1), causes the surface curvature of the reflector surface 14 to change as necessary to remove the interference pattern generated at the holographic medium 64. Accordingly, a closed loop, real time system is created which operates to monitor, through a holographic interferogram, the distortion in curvature of a curved reflector surface, and to apply appropriate corrections as needed in real time.

Figure 5:
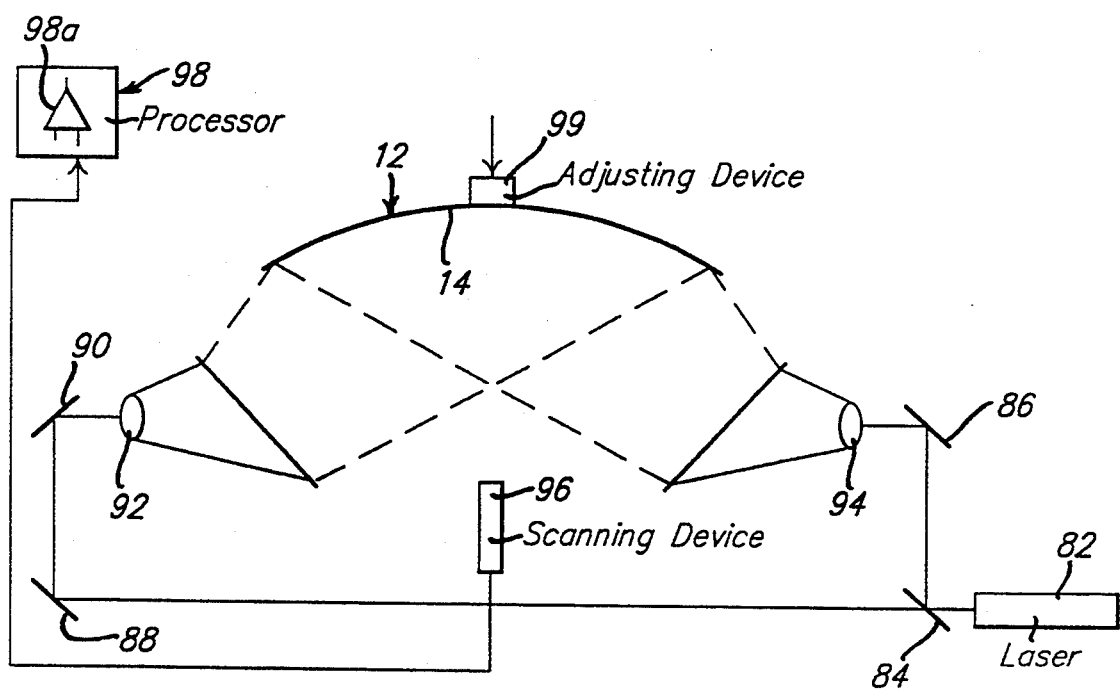
FIG. 5 is another alternative preferred embodiment of the present invention incorporating the use of two identical holographic images to form a holographic interferogram on the curved surface of the reflector.

Referring now to FIG. 5, another alternative preferred embodiment 80 employing holographic interferometry is disclosed. This embodiment generally comprises a laser 82, a beam splitter 84, turning flats 86, 88 and 90, and a pair of lenses 92 and 94 positioned at first and second angles relative to the surface 14 of the reflector or workpiece 12. Two identical holograms in accordance with the hologram of a reference workpiece are projected by laser 82 and beam splitter 84 onto the turning flats 86, 88 and 90. Turning flats 86 and 90 direct the holograms to lenses 92 and 94 which project the identical holograms onto the surface 14 of the reflector 12. If the surface 14 has no imperfections or irregularities in its curvature, then the surface 14 will be uniformly illuminated.

A scanning device 96 operates to scan the surface 14 of the reflector 12 to thereby describe the resulting luminous distribution of the holograms being projected onto the surface 14, and transmits electrical signals in accordance therewith to a processor 98 having a comparator 98a. The luminous distribution of the surface 14 operates to indicate the size, location and extent of errors for irregularities in the curvature of the surface 14. When scanning the surface 14, such irregularities will appear attenuated due to the interference generated by the error or irregularity. If no irregularities are present in the surface 14, the surface 14 will appear to be uniformly illuminated when scanned by scanner 96. Specific algorithms can be developed to reveal random or periodic errors occurring in the scanned image.

The processor 98 operates to receive the electrical signals from the scanning device 96 and to determine therefrom, in connection with comparator 98a, the location and magnitude of errors, or irregularities, in the surface 14. The processor 98 then sends an appropriate error correction signal to an adjusting device 99 operably associated with the reflector 12, which controllably modifies the curvature of the reflector 12 to remove the irregularities in the curvature.

Accordingly, the embodiment 80 of FIG. 5 operates to produce a holographic interferogram on the surface 14 of the reflector 12, from opposing angles, which is indicative of the location and magnitude of irregularities in the curved surface 14 of the reflector 12. Referring briefly to FIG. 8, a simplified block diagram of the steps of the operation of the apparatus of FIG. 5 is shown.

Figure 6:
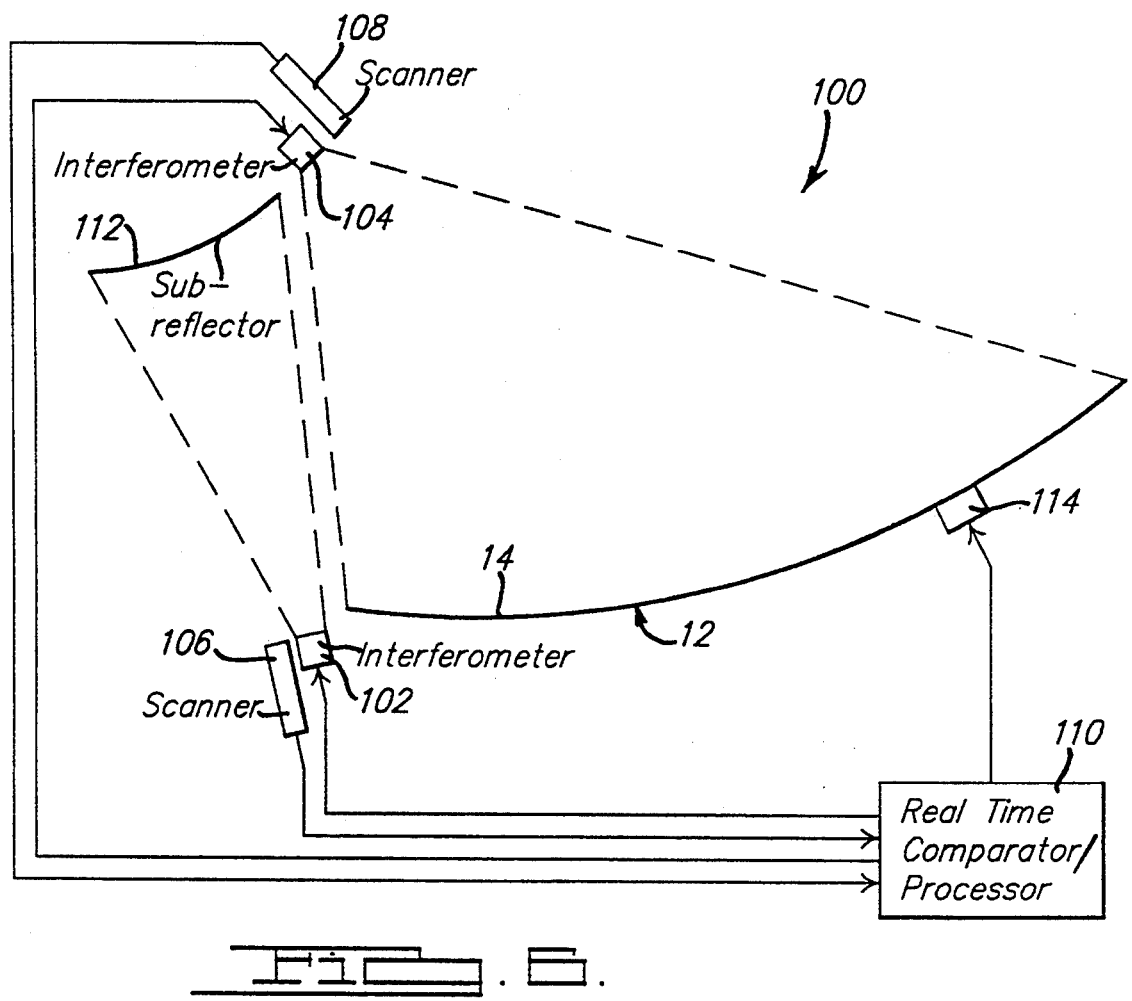
FIG. 6 is another alternative preferred embodiment of the present invention illustrating the use of separate scanners and interferometers.

Referring now to FIG. 6, there is shown a real time interferometric comparator apparatus 100 in accordance with another alternative preferred embodiment of he present invention. The apparatus 100 is particularly well adapted for closed loop, on-orbit correction of irregularities in the curvature of a complex surface such as a reflector antenna of a satellite system.

The apparatus 100 generally comprises first and second independent interferometers 102 and 104, respectively, first and second scanners 106 and 108, respectively, and a real time comparator/processor 110. A subreflector 112 is incorporated to direct the optical signal transmitted by interferometer 102 against the reflector surface 14.

In operation, optical interference signals are transmitted by the independent interferometers 102 and 104 onto the surface 14 of the reflector 12. Scanners 106 and 108 independently read the interferogram resulting on the surface 14 of the reflector 12 and provide signals to the processor 110 indicative of the resulting interferogram. The processor 110 then provides appropriate corrective action to an adjusting device 114 operably associated with the reflector 12 to controllably vary the curvature of the surface 14, in real time, to remove the irregularity in curvature. Thus, the apparatus 100 operates as a closed-loop system to continuously monitor and correct, in real time, the curvature of the reflector surface 14 to maintain the curvature in accordance with an ideal, curved, reference surface.

Figure 7:
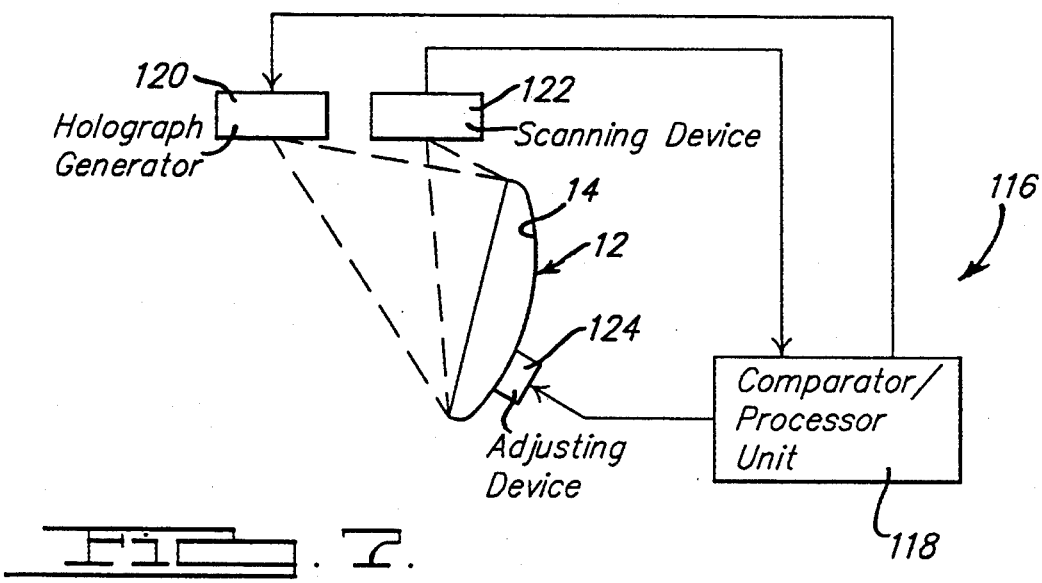
FIG. 7 is a simplified illustration of another alternative preferred embodiment of the present invention showing the use of a single hologram projector and scanning device.

Referring now to FIG. 7, there is shown a real time interferometric comparator apparatus 116 in accordance with another alternative preferred embodiment of the present invention. Apparatus 116 incorporates holography implemented by a single hologram producing generator for creating an interferogram indicative of the curvature of the surface 14 of the reflector 12. Apparatus 116 is also particularly well adapted to provide a closed loop, on-orbit correction system for correcting irregularities in the curvature of large, complexly shaped objects such as reflector antennas of orbiting satellites.

Apparatus 116 generally includes a comparator/processor device 118, a holograph projecting device 120, and a scanning device 122. In operation, the comparator/processor unit 118 supplies data representative of a surface of a reference workpiece or reflector having a "perfect" or desired surface curvature. The single holograph projector 120 projects a single hologram in accordance with this data onto the surface 14 of the reflector 12. This results in a holographic interferogram indicative of the location and magnitude of irregularities in the curvature of surface 14. Scanning device 122 simultaneously optically scans the resulting interferogram and sends electrical signals in accordance therewith back to the comparator/processor unit 118. If no irregularities are present in the curvature of the surface 14, then no interference pattern will be produced, and the holographic image scanned off of the surface 14 will be identical to the hologram projected from projecting device 120. If any irregularities are detected in the curvature of the reflector surface 14, the comparator/processor unit 118 determines, mathematically, the proper error correction signals needed to eliminate the irregularity and applies the signals to an adjusting means 124 of the reflector 12. Accordingly, the curvature of the surface 14 is continuously monitored in real time, and corrected in real time to maintain a perfect or desired curvature. The apparatus 116 thus functions as a closed loop system, with the scanning device 122 continuously operating to scan the interferogram resulting on the surface 14, while the adjusting means 124 is continuously controlled, in real time, in response to the output of the scanning device 122.

The closed loop design of the preferred embodiments disclosed herein thus enables real time monitoring and control over complexly shaped surfaces. In aerospace applications, the embodiments enable continuous monitoring and correction of changes in the curvature of a reflector antenna, which changes may be due to severe variations in the thermal stresses experienced by the reflector antenna while on-orbit. Thus, the embodiments enable the RMS surface contour accuracy of such a reflector antenna to be closely monitored and controlled.

The embodiments disclosed herein further have significant utility in the manufacturing, alignment and testing of virtually any workpiece having a complexly shaped surface, where the shape of the surface is of particular importance. For example, in manufacturing operations, surface contour inaccuracies can be described by the apparatus disclosed herein in real time. The embodiments disclosed herein could be used to control automated manufacturing processing and/or provide visual evidence of surface contour errors. The implementation of interferometric or holographic metrology provides a measurement system of the highest resolution yet allows adjustability to coarser resolutions of conventional systems.

In testing applications, monitoring and logging of changes in surface contour of a workpiece as such changes occur would be highly useful during thermal cycle and static load testing operations. Identification of vibrational modes during vibration testing could reveal problems in an engineering model and also verify analytical models. The recording of strain and modal data during any forcing activity is very useful.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A real time, interferometric comparator apparatus for detecting deviations in curvature of a curved workpiece from a curvature of a reference workpiece, said apparatus comprising:
   means for generating at least a first optical signal and projecting said first optical signal onto said workpiece;
   said optical signal forming an interferogram in response to irradiating a curved surface of said workpiece indicative of irregularities in said curvature of said curved workpiece;
   means for optically scanning said interferogram;
   processing means responsive to said optical scanning means for determining deviations in said curvature of said curved surface of said workpiece from said curvature of said reference workpiece, in real time;
   adjusting means responsive to said processing means and operably associated with said curved surface of said workpiece for controllably varying said curvature of said workpiece, in real time, to remove said deviations in said curvature of said workpiece from said curvature of said reference workpiece and
   wherein said optical signal comprises first and second identical hologram indicative of said curvature of said reference workpiece, and projected simultaneously onto said curved surface of said workpiece.

2. A real time, interferometric comparator apparatus for detecting deviations in the curvature of a curved workpiece from a curvature of a reference workpiece, said apparatus comprising:
   means for generating first and second optical signals;
   means for projecting said first optical signal onto said workpiece;
   means for projecting said second optical signal onto said workpiece simultaneously with said first optical signal to thereby form an interferogram indicative of a deviation in curvature of said curved workpiece from said curvature of said reference workpiece;
   means for optically scanning said workpiece to thereby optically read said interferogram;
   processing means including a comparator, said processing means being responsive to said scanned interferogram for comparing said interferogram against a reference signal indicative of said curvature of said reference workpiece and determining said deviations in said curvature of said workpiece from said curvature of said reference workpiece; and
   adjusting means responsive to said processing means for adjusting the curvature of said workpiece in response to signals from said processing means to cause said curvature of said workpiece to conform to said curvature of said reference workpiece.

3. The apparatus of claim 2, wherein said first optical signal represents a first laser beam having a first wavelength; and
   wherein said second optical signal represents a second laser beam having a second wavelength, said second wavelength being different than said first wavelength.

4. The apparatus of claim 2, wherein said first optical signal comprises a holographic image of said reference workpiece; and
   wherein said second optical signal comprises a second holographic image, said first and second holographic images being identical to each other.

5. The apparatus of claim 2, wherein said first and second optical signals form a composite holographic image, said composite holographic image indicating the location and magnitude of irregularities in said curvature of said workpiece relative to said reference workpiece.

6. A real time, interferometric comparator apparatus comprising:
   means for generating a beam of coherent light adapted to form a hologram;
   beam splitting means responsive to said beam of coherent light for generating a first optical signal representative of a first hologram and a second optical signal representative of a second hologram, said first optical signal being adapted to be optically reflected off of a work surface;
   holographic medium means for forming a holographic image of a predetermined reference work surface when said second optical signal irradiates said holographic medium means and for generating a holographic interference image when said first optical signal has been reflected off of said work surface onto said holographic medium means while said second optical signal simultaneously irradiates said holographic medium means; and
   means for processing said holographic interference image in real time to determine the variance of said curvature of said work surface from a predetermined reference work surface.

7. The apparatus of claim 6, wherein said means for processing said holographic image includes a comparator for comparing said holographic image with said predetermined reference work surface.

8. The apparatus of claim 6, wherein said work surface comprises a curved reflector; and
   wherein said curved reflector includes means for adjusting the curvature of said reflector in real time in response to signals from said processing means.

9. A real time interferometric comparator apparatus comprising:
   means for generating a hologram, said hologram being indicative of the curvature of a surface of a reference workpiece;
   means for splitting said hologram into first and second identical holograms;
   means for projecting said first hologram from a first angle onto a surface of a workpiece;
   means for projecting said second hologram from a second angle onto said surface of said workpiece, said projecting of said first and second holograms simultaneously onto said surface of said workpiece generating a resulting holographic image on said surface of said workpiece being indicative of differences in the curvature of said workpiece from said reference workpiece;
   means for optically scanning said resulting holographic image; and processing means responsive to said optical scanning means for generating an error correction signal in real time indicative of the position and magnitude of deviations in the curvature of said workpiece from said reference workpiece.

10. The apparatus of claim 9, wherein said processing means includes a comparator for comparing said resulting holographic image against said hologram in real time.

11. The apparatus of claim 9, wherein said workpiece includes adjusting means responsive to said error correction signal for changing said curvature of said workpiece in real time so as to eliminate said deviation of said resulting holographic image from said hologram.

12. A real time, interferometric holographic comparator apparatus for determining deviations in a curvature of a reflector from a curvature of a reference reflector, said apparatus comprising:
   means for generating and irradiating said reflector with first and second identical optical interference signals, said first and second optical interference signals forming an interferogram indicative of deviations in the curvature of said reflector;
   a first scanner for scanning said interferogram formed by said first and second optical interference signals and generating a first output signal;
   a second scanner for scanning said interferogram formed by said first and second optical interference signals and generating a second output signal;
   real time processing means including a comparator and being responsive to said first and second output signals, for comparing said scanned interferogram with said curvature of said reference reflector to determine deviations in said curvature of said reflector from said curvature of said reference reflector.

13. The apparatus of claim 12, wherein said reflector comprises adjusting means responsive to said real time processing means for changing the curvature of said reflector in accordance with an error correction signal generated by said real time processing means, to thereby cause the curvature of said reflector to conform to said reference reflector.

14. A method for monitoring and correcting the curvature of a reflector in real time to conform continuously to a desired reference curvature, said method comprising:
   projecting a first hologram onto said reflector;
   simultaneously projecting a second hologram onto said reflector, said first and second holograms each being indicative of said reference curvature and forming an interferogram when irradiating said reflector:
   scanning said interferogram as said holograms are projected onto said reflector;
   determining, in real time, variations in the curvature of a surface of said reflector from said reference curvature by analyzing said interferogram;
   generating an error correction signal in real time operable to remove said variations: and
   causing an adjusting device associated with said reflector, and responsive to said error correction signal, to apply said error correction signal to said reflector, to thereby eliminate said variation in said curvature of said reflector from said reference curvature.

15. A method for monitoring and correcting the curvature of a reflector in real time to conform continuously to a desired reference curvature, said method comprising:
   projecting a first optical signal onto said reflector from a first angle relative to said reflector;
   projecting a second optical signal onto said reflector from a second angle relative to said reflector simultaneously with said first optical signal to thereby form an optical interference pattern;
   scanning said interference pattern on said reflector;
   using a processor to analyze said interference pattern to determine at least the locations of deviations in the curvature of said reflector from said reference curvature; and
   causing said curvature of said reflector to be altered so as to bring said curvature of said reflector into conformance with said reference curvature.

16. A real time, interferometric comparator apparatus for detecting deviations in a curvature of a curved reflector from a curvature of a reference reflector and correcting said curvature of said curved reflector, in real time, to match said curvature of said reference reflector, said apparatus comprising:
   means for generating and projecting a first optical signal in the form of a holograph representative of said curvature of said reference reflector directly onto a surface of said curved reflector;
   said holograph forming an interferogram in response to irradiating said surface of said curved reflector, said interferogram being indicative of deviations in said curvature of said reflector from said curvature of said reference reflector;
   holograph scanning means for scanning said surface of said reflector to thereby read said interferogram formed on said curved reflector to thereby read said interferogram;
   real time processing means responsive to said holograph scanning means for determining said deviations in said curvature of said curved reflector, in real time, and for generating corrective signals representative of corrections needed to be applied to said curved reflector to bring said curvature of said curved reflector into accordance with said curvature of said reference reflector;
   adjusting means responsive to said real time processing means and operably associated with said curved surface of said curved reflector for controllably varying said curvature of said curved reflector in accordance with said corrective signals, in real time, in response to said deviations in said curvature of said curved reflector from said curvature of said reference reflector to thereby maintain said curvature of said curved reflector in accordance with said curvature of said reference reflector.

* * * * *